(12) United States Patent
Labovich et al.

(10) Patent No.: US 11,468,090 B2
(45) Date of Patent: Oct. 11, 2022

(54) MAINTAIN CONSTANT LOAD ON GLOBAL DATABASE AFTER REGIONALIZATION

(71) Applicant: Google LLC, Mountain View, CA (US)

(72) Inventors: Pavel Labovich, Bothell, WA (US); Vikas Yadav, Kirkland, WA (US); Yuly Suvorov, Kirkland, WA (US)

(73) Assignee: Google LLC, Mountain View, CA (US)

( * ) Notice: Subject to any disclaimer, the term of this patent is extended or adjusted under 35 U.S.C. 154(b) by 226 days.

(21) Appl. No.: 16/682,608

(22) Filed: Nov. 13, 2019

(65) Prior Publication Data

US 2021/0141806 A1    May 13, 2021

(51) Int. Cl.
*G06F 16/27* (2019.01)
*G06F 9/46* (2006.01)
*G06F 16/2455* (2019.01)

(52) U.S. Cl.
CPC ............ *G06F 16/273* (2019.01); *G06F 9/466* (2013.01); *G06F 16/24552* (2019.01)

(58) Field of Classification Search
None
See application file for complete search history.

(56) References Cited

U.S. PATENT DOCUMENTS

2018/0246911 A1* 8/2018 Lee .................. G06F 16/21
2019/0392067 A1* 12/2019 Sonawane ........... G06F 16/2435

* cited by examiner

*Primary Examiner* — Eddy Cheung
(74) *Attorney, Agent, or Firm* — Lerner, David, Littenberg, Krumholz & Mentlik, LLP (57) ABSTRACT

The present disclosure provides for maintaining a steady load on a global database. In a global database with regionalized replication, some requests are handled by a global clone in a region, as opposed to the global database. If the global clone in the region is not up to date, the request may "fallback," where it is redirected to the global database. By serving some requests at the global clone, instead of the global database, the traffic to the global data may be significantly reduced. However, the global database has different mechanisms which depend on a steady load. Accordingly, the present disclosure provides a mechanism for maintaining a constant load on the global database, despite regionalized replication. Maintaining a constant load ensures that the global database will be able to handle fallbacks when request to clones fail.

20 Claims, 10 Drawing Sheets

MAINTAIN CONSTANT LOAD ON GLOBAL DATABASE AFTER REGIONALIZATION

BACKGROUND

Infrastructure-as-a-Service is supported by a global network of computing devices that serve as the control and data plane. A data store provides the data for such large control plane services. Within the global network there are multiple distinct regions. While some of the computing resources are isolated within the regions, some templates are global. However, the control planes typically do not communicate directly with the global database. A global stack is maintained for global resources. The stack may be, for example, a set of computing resources with business logic. When a customer wants to create a virtual machine, for example, a request is sent to a regional stack, and business logic implemented in the regional stack will reach out to the global database to obtain the requested information.

One problem with the above setup is that all regions are interconnected by network links, and the links can experience outages. Accordingly, the global database is replicated in a global clone database. However, because the global database and the global clone are asynchronously updated, there is typically a delay between updating the global database and replicating such updates in the global clone database. For example, the delay can be anywhere from tens of milliseconds to tens of seconds. Accordingly reading from the global database and the global clone database at a given time may produce inconsistent reads. This may trigger multiple issues and side effects in the business logic.

BRIEF SUMMARY

The present disclosure provides for maintaining a steady load on a global database. In a global database with regionalized replication, some requests are handled by a global clone in a region, as opposed to the global database. If the global clone in the region is not up to date, the request may "fallback", where it is redirected to the global database. By serving some requests at the global clone, instead of the global database, the traffic to the global data may be significantly reduced. However, the global database has different mechanisms which depend on a steady load. For example, the global database may scale down if its load decreases for some amount of time, thereby relinquishing resources. Moreover, if the database is scaled down, and then traffic ramps up as a result of numerous fallbacks, the global database may become overloaded resulting in errors or request failures. As another example, the global database may be a distributed database that dynamically reallocates data among servers to facilitate load. Maintaining a constant load facilitate such load-splitting. As yet a further example the global database may rely on in-memory cache. Without a load, such cache may become "cold" and dropped. Accordingly, the present disclosure provides a mechanism for maintaining a constant load on the global database, despite regionalized replication. Maintaining a constant load ensures that the global database will be able to handle fallbacks when request to clones fail.

One aspect of the disclosure provides a method, including receiving, at a regional global clone in a first region replicating data of a global database, a transaction request, determining, by one or more processors in the first region, whether the global clone is ready to fulfil the transaction request, when the global clone is determined to be ready, fulfilling the transaction request by the global clone, when the transaction request is fulfilled by the global clone, generating a background request, corresponding to the transaction request, and sending the background request to the global database for processing.

Another aspect of the disclosure provides a system, including one or more processors in communication with a regional global clone in a first region replicating data of a global database. The one or more processors are configured to receive a transaction request from a client device, determine whether the global clone is ready to fulfil the transaction request, when the global clone is determined to be ready, fulfil the transaction request by the global clone, when the transaction request is fulfilled by the global clone, generate a background request, corresponding to the transaction request, and send the background request to the global database for processing.

Yet another aspect of the disclosure provides a non-transitory computer-readable medium storing instructions executable by one or more processors for performing a method of serving read requests to a global clone, the method comprising receiving, at a regional global clone in a first region replicating data of a global database, a transaction request, determining whether the global clone is ready to fulfil the transaction request, when the global clone is determined to be ready, fulfilling the transaction request by the global clone, when the transaction request is fulfilled by the global clone, generating a background request, corresponding to the transaction request, and sending the background request to the global database for processing.

DETAILED DESCRIPTION

Figure 1:
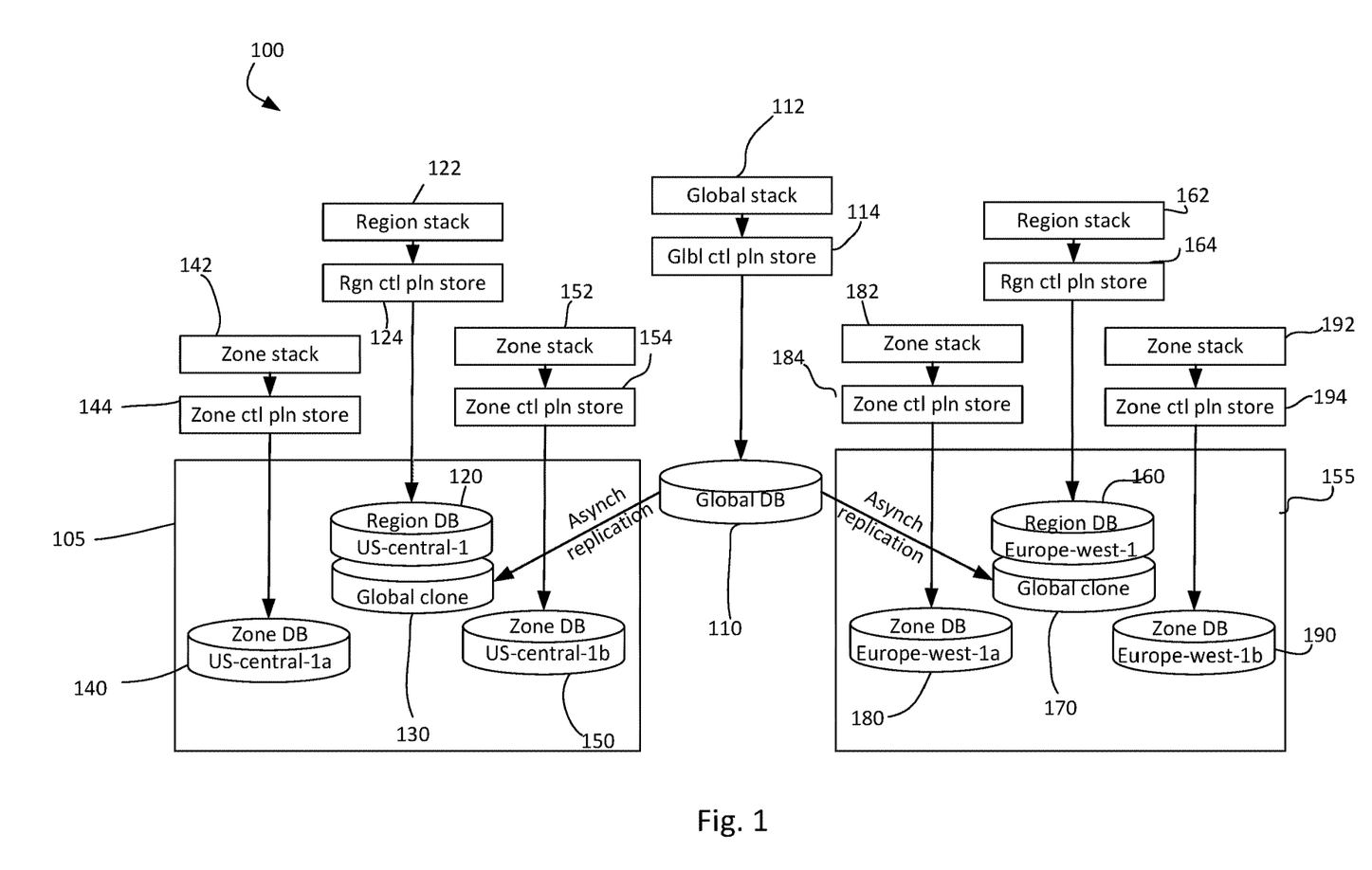
FIG. 1 illustrates an example system according to aspects of the disclosure.

FIG. 1 illustrates an example system 100 including a global database 110 and a plurality of regional databases 120, 160. Within each region 105, 155 are zone databases 140, 150, 180, 190. For example, the zones in which zone databases 140, 150 reside may be sub-areas of the region served by region database 120. Similarly, the zones in which zone databases 180, 190 reside may be sub-areas of the region served by region database 160. The zones may have high-bandwidth, low-latency network connections to other zones in the same region. While only a few regions 105, 155 are shown, it should be understood that a global system may include any number of regions, with any number of zones in each region.

Each region 105, 155 also includes a global clone database 130, 170. The global database 110 is asynchronously replicated to the global clone databases 130, 170. In some examples, all data from the global database 110 may be replicated to both clones 130, 170. According to other examples, some data from the global database 110 is replicated to a first clone 130, while other data from the global database 110 is replicated to the second clone 170. For example, particular projects may be replicated to the clone in a particular region. A project may be, for example, a grouping of resources that belong to the same customer.

Each database is controlled by a stack. For example, global stack 112 serves as the control plane for the global database 101. Region stacks 122, 162 serve as the control planes for region databases 120, 170, respectively. Within a first region 105, zone stacks 142, 152 serve as the control planes for the zone database 140, 150, respectively. Within a second region 155, zone stacks 182, 192 serve as control planes for the zone databases 180, 190 respectively.

Control plane stores provide a data layer for the control plane services. Each database and stack may have a dedicated control plane store. For example, as shown in FIG. 1, global control plane store 114 provides the data layer for the global stack 112. Region control plane stores 124, 164 provide data layers for the region stacks 122, 162, respectively. Zone control plane stores 144, 154, 184, 194 provide data layers for the zone stacks 142, 152, 182, 192, respectively.

The global database 110 may be capable of reading past versions of data. For example, when updates are made to the database 110, rather than immediately erasing the previous information, the previous information may be retained for a period of time. The period of time may be minutes, hours, days, etc. Accordingly, the global database 110 allows a control plane store 114 service to read data at an arbitrary timestamp in the past, such as a "current" timestamp, −30 minutes, −4 hrs, etc.

Figure 2:
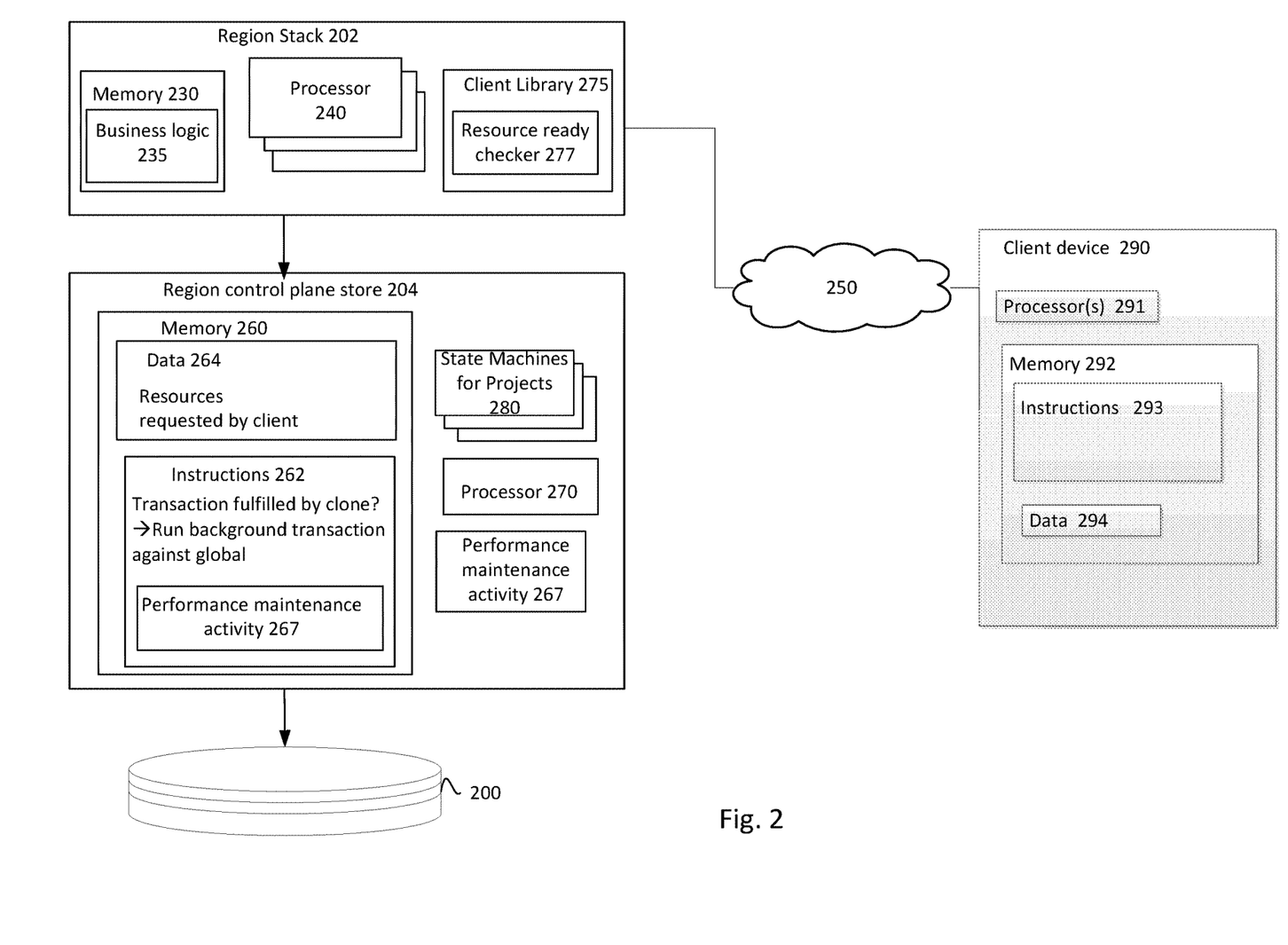
FIG. 2 is a block diagram illustrating example details of components of the system of FIG. 1.

FIG. 2 provides further details regarding the stacks and control plane stores. Region stack 202 includes a set of computing resources. For example, the stack 202 includes one or more processors 240. The processors 240 are configured to execute data and instructions in memory 230. For example, the processors 240 may execute business logic 235 to control virtual infrastructure (IaaS) of a project.

The processors 240 can be any conventional processors, such as commercially available CPUs. Alternatively, the processors can be dedicated components such as an application specific integrated circuit ("ASIC") or other hardware-based processor. Although not necessary, the stack 202 may include specialized hardware components to perform specific computing processes.

The stack 202 may use the database 200 to persist the state of resources processed by the processor 240. The database 200 may be a type of non-transitory computer readable medium capable of storing information accessible by the processor 240, such as a hard-drive, solid state drive, tape drive, optical storage, memory card, ROM, RAM, DVD, CD-ROM, write-capable, and read-only memories.

The memory 230 can store information accessible by the processor 240, including instructions that can be executed by the processor 240 and that can be retrieved, manipulated or stored by the processor 240.

The instructions can be a set of instructions executed directly, such as machine code, or indirectly, such as scripts, by the processor 240. In this regard, the terms "instructions," "steps" and "programs" can be used interchangeably herein. The instructions can be stored in object code format for direct processing by the processor 240, or other types of computer language including scripts or collections of independent source code modules that are interpreted on demand or compiled in advance. Functions, methods, and routines of the instructions are explained in more detail in the foregoing examples and the example methods below.

The data can be retrieved, stored or modified by the processor 240 in accordance with the instructions. The data can also be formatted in a computer-readable format such as, but not limited to, binary values, ASCII or Unicode. Moreover, the data can include information sufficient to identify relevant information, such as numbers, descriptive text, proprietary codes, pointers, references to data stored in other memories, including other network locations, or information that is used by a function to calculate relevant data.

The memory 230 includes business logic 235 for controlling data in the database 200. For example, the business logic 235 may determine how transactions with the database 200 are handled. Depending on a project state of the global clone for a project, the business logic 235 will serve the read requests differently. For example, and as described further herein, if the global clone for a project is pending, the business logic 235 will read data from the global database at a time corresponding to a timestamp when the clone entered the pending state. If the global clone for the project is ready, the business logic 235 will serve the request by reading data from the global clone.

The stack 202 region control plane store 204 further includes a client library 275. The client library includes a resource ready checker 277 which may operate to determine whether a fallback of a global clone request to the global database should be performed. For example, the resource ready checker 277 may be a class or function called when a request is made to the global clone to determine whether the global clone is updated and ready to serve the request. The result from the resource ready checker 277 may be used to determine how the request is handled. If the global clone is ready, the global clone may serve the request. If not, the resource ready checker 277 may return an error, and in response the request may be redirected to the global database.

Although FIG. 2 functionally illustrates the processor, memory, and other elements of computing device 200 as being within the same block, the processor, computer, computing device, or memory can actually comprise multiple processors, computers, computing devices, or memories that may or may not be stored within the same physical housing. For example, the memory can be a hard drive or other storage media located in housings different from that of the computing devices 200. Accordingly, references to a processor, computer, computing device, or memory will be understood to include references to a collection of processors, computers, computing devices, or memories that may or may not operate in parallel. For example, the computing devices 200 may include server computing devices operating as a load-balanced server farm, distributed system, etc. Yet further, although some functions described below are indicated as taking place on a single computing device having a single processor, various aspects of the subject matter described herein can be implemented by a plurality of computing devices, for example, communicating information over a network.

The region control plane store 204 may contain one or more processors 270, memory 260, and other components for providing a data layer to control plane services. The control plane store 204 may further include one or more state machines 280 for projects replicated to the global clone in that region. The state machines 280 may be, for example, computing devices programmed to change from one state to another in response to particular inputs or conditions. As described further herein in connection with the example of FIG. 4, the states may include an invalid state, a pending state, and a ready state. In some examples the states may further include a disabled state.

The memory 260 can store information accessible by the processor 270, including instructions 262 that can be executed by the processor 270. Memory can also include data 264 that can be retrieved, manipulated or stored by the processor 270. The memory 260 may be a type of non-transitory computer readable medium capable of storing information accessible by the processor 270, such as a hard-drive, solid state drive, tape drive, optical storage, memory card, ROM, RAM, DVD, CD-ROM, write-capable, and read-only memories. The processor 270 can be a well-known processor or other lesser-known types of processors. Alternatively, the processor 270 can be a dedicated controller such as an ASIC.

The instructions 262 can be a set of instructions executed directly, such as machine code, or indirectly, such as scripts, by the processor 270. In this regard, the terms "instructions," "steps" and "programs" can be used interchangeably herein. The instructions 262 can be stored in object code format for direct processing by the processor 270, or other types of computer language including scripts or collections of independent source code modules that are interpreted on demand or compiled in advance.

The data 264 can be retrieved, stored or modified by the processor 270 in accordance with the instructions 262. For instance, although the system and method is not limited by a particular data structure, the data 264 can be stored in computer registers, in a relational database as a table having a plurality of different fields and records, or XML documents. The data 264 can also be formatted in a computer-readable format such as, but not limited to, binary values, ASCII or Unicode. Moreover, the data 264 can include information sufficient to identify relevant information, such as numbers, descriptive text, proprietary codes, pointers, references to data stored in other memories, including other network locations, or information that is used by a function to calculate relevant data.

The instructions 262 may include performance maintenance activity 267. The maintenance activity may be executed to determine conditions of a project in the global clone, and to update the state of the global clone for the project based on the determined conditions. For example, the maintenance activity 267 may determine that the global clone for the project has been enabled, and update the global clone for the project from an invalid state to a pending state. Further, the maintenance activity 267 may determine that the global clone for the project is caught up to particular point in time of the global database. Accordingly, the maintenance activity 267 may update the state of the state machine 280 for the project, transitioning the project state from the pending state to the ready state.

The instructions 262 may further be executed to maintain a constant load on the global database. For example, the processor 270 may execute the instructions 262 to determine whether a transaction was fulfilled by the global clone. If so, a background transaction is run against the global database to apply a load to the global database, even though the request was served by the clone. Once the load is applied at the global database the request may be aborted, as opposed to returning an additional result to the client. In some examples, the data 264 may further include a cache of resources requested by the client, for use in serving the request. This is described in further detail in connection with FIG. 10.

Although FIG. 2 functionally illustrates the processor 270 and memory 260 as being within the same block, the processor 270 and memory 260 may actually include multiple processors and memories that may or may not be stored within the same physical housing. For example, some of the instructions 262 and data 264 can be stored on a removable CD-ROM and others within a read-only computer chip. Some or all of the instructions and data can be stored in a location physically remote from, yet still accessible by, the processor 270. Similarly, the processor 270 can actually include a collection of processors, which may or may not operate in parallel.

The database 200 may be a single storage device or a plurality of storage devices, such as hard drives, random access memory, disks, disk arrays, tape drives, etc. The database 200 may implement any of a number of architectures and technologies, including, but not limited to, direct attached storage (DAS), network attached storage (NAS), storage area networks (SANs), fibre channel (FC), fibre channel over Ethernet (FCoE), mixed architecture networks, or the like. Further, in some examples the database 200 may include virtualized or containerized environments. For example, the database 200 may include one or more virtual machines running on a host machine. The database 200 may store, for example, data files, documents, code, schemas, persistence frameworks, applications, or any of a variety of other information or tools typically stored in databases.

The stack 202 may serve requests from a client device 290, such as over a network 250. The client device 290 may be configured with a processor 291, memory 292, instructions 293, and data 294. The client 290 may be a personal computer, intended for use by a person having all the internal components normally found in a personal computer such as a central processing unit (CPU), hard drive, and input/output device, and all of the components used for connecting these elements to one another. The client 290 may be any device capable of processing instructions and transmitting data to and from humans and other computers including general purpose computers, tablets, mobile phones, smartwatches, home assistants, video game systems, network computers lacking local storage capability, set top boxes for televisions, and other networked devices.

The client 290 may include an application interface module used to access a service made available by the database 200. For example, the application interface module may include sub-routines, data structures, object classes and other type of software components used to allow servers and clients to communicate with each other. In one aspect, the application interface module may be a software module operable in conjunction with several types of operating systems known in the arts. For example, the client may be connected to a Structured Query Language (SQL) database server that may operate in conjunction with the application interface module for saving and retrieving information data.

The network 250, and intervening nodes, may include various configurations and protocols including the Internet, World Wide Web, intranets, virtual private networks, wide area networks, local networks, private networks using communication protocols proprietary to one or more companies, Ethernet, WiFi (e.g., 702.71, 702.71b, g, n, or other such standards), and HTTP, and various combinations of the foregoing. Such communication may be facilitated by a device capable of transmitting data to and from other computers, such as modems (e.g., dial-up, cable or fiber optic) and wireless interfaces.

Figure 3:
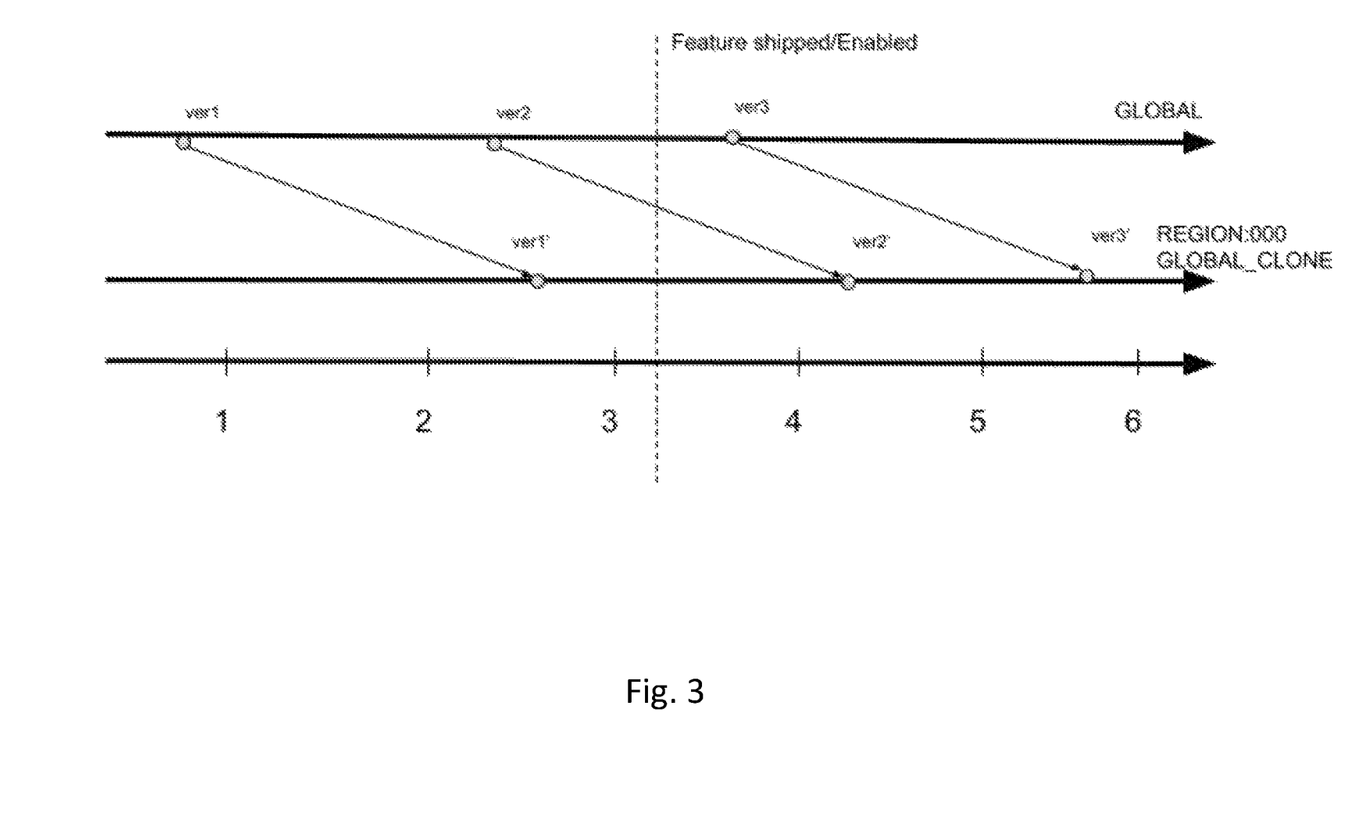
FIG. 3 is a timing diagram illustrating an example of delays between a global database and a global clone according to aspects of the disclosure.

FIG. 3 is a timing diagram illustrating an example of delays between a global database and a global clone. As shown, version 1 is updated in the global database prior to a time 1. The version may be, for example, a version of a feature, such as a project, application, or the like. Because of delays, version 1 is not replicated in the global clone until after time 2. In this example, by the time version 1 is replicated in the global clone, version 2 is available in the global database. Accordingly, if a customer request were processed at time 1, the business logic would see version 1 from the global database. At time 2, the business logic would still see version 1 from the global database.

After time 3, the feature is shipped and enabled in a particular geographic region served by a region database, such as the first region 105 of FIG. 1. As such, a customer request processed at time 3 would produce the most recent version from the global database, version 2, because at time 3 the feature has not yet been enabled in the region.

Before time 4, version 3 is implemented in the global database. At this time, however, version 2 has still not been implemented in the global clone. Accordingly, a request processed at time 4 would produce version 1 from the global clone. Although version 3 has already been implemented in the global database at this point, the global clone is producing data from a prior version. This can result in unintended side effects. For example, if version 3 was a "delete" of a virtual network, producing version 1 from the global clone would essentially "un-delete" the virtual network.

By time 5, the global clone will produce version 2 of the feature, but this version is still out of data. It is not until time 6 that the global clone is caught up to the global database. Accordingly, any requests prior to time 6 may receive inaccurate responses.

The unintended effects cause by the differences in the global database and the global clone at different times may be resolved by implementing a state machine for each project in each region. For example, referring back to FIG. 1, the state machines may be implemented in the region control plane stores 124, 164 of each region 105, 155.

Figure 4:
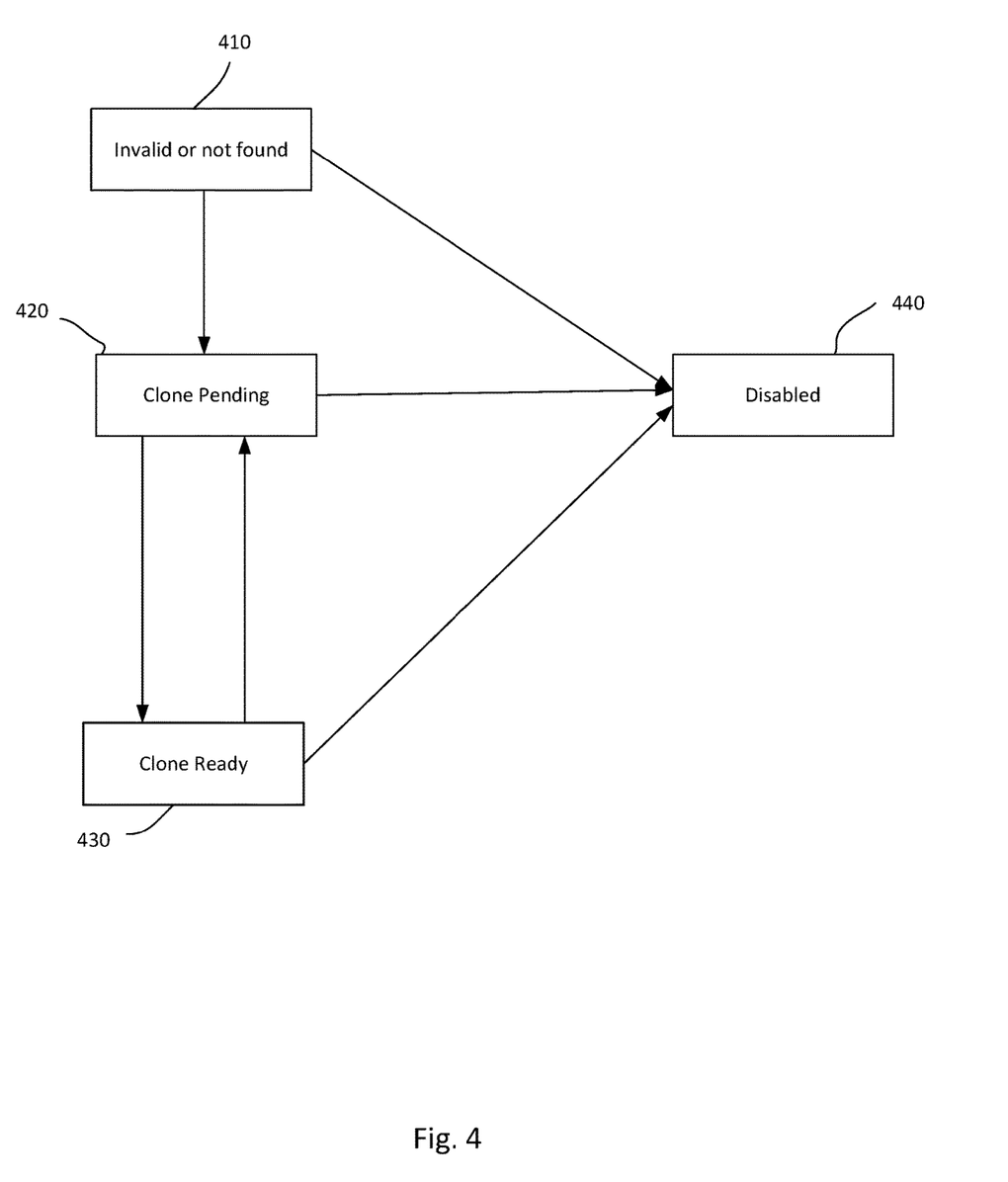
FIG. 4 is a state diagram illustrating examples of different project states for projects in a global clone according to aspects of the disclosure.

FIG. 4 is a state diagram illustrating examples of the different project states for projects in a global clone. According to this example, the different states include an invalid state 410, a clone_pending state 420, a clone_ready state 430, and a disabled state 440.

New projects may automatically be placed in the invalid state 410. In this state, the project may not yet be enabled in the global clone. Accordingly, all requests to read data that are processed while the project is in the invalid state will produce data from the global database.

The maintenance activity may discover new projects, for example, by scanning. For example, the maintenance activity may read every project resource in the global database and detect if the project is new. The project may be determined to be new if no project state exists in a particular region clone. When the new project has been detected, the project may be set to the clone_pending state 420. A timestamp for the time when the project is changed from the invalid state 410 to the clone_pending state 420 is recorded. For example, as described further in connection with FIG. 5 below, the timestamp may be recorded in the regional database along with an indication of the project state for the project.

All global data requests to a region control plane store for a project in the clone_pending state 420 are redirected to the global database at a time corresponding to the recorded timestamp. For example, a project may transition from the invalid state 410 to the clone_pending state 420 at a time t1, and time t1 is recorded. While a read request may be received at a later time t1+x, if the project is still in the clone_pending state 420, the read request will be redirected to the global database at time t1. While it is possible that the global database may have been updated with a newer version of the project between time t1 and time t1+x, the version at time t1 will nevertheless be produced for consistency.

The maintenance activity in the region control plane store may also detect transactions for projects in the clone_pending state 420. For example, the maintenance activity may detect that a threshold number of reads or writes for the project have occurred. The threshold number may be one or more. When this occurs, the maintenance activity may determine whether the project should be transitioned to the clone_ready state 430. For example, the maintenance activity may verify whether the global clone in that region is caught up to the global database for the project. The global clone may be considered caught up if the most recent version available in the global clone is the same as the version available in the global database as of the recorded timestamp. If the global clone is caught up, the maintenance activity changes the state of the project to the clone_ready state 430. In the clone_ready state 430, all reads are fulfilled by the global clone.

The maintenance activity may further detect when the project in the clone_ready state 430 becomes inconsistent with the global database. For example, the maintenance activity may periodically check whether the global clone is still caught up to the global database. In other examples, the maintenance activity may detect updates to the global database for the project, and may in response check whether the update has been replicated to the global clone. When the global clone for the project is determined to be inconsistent with the global database, the project state for the project may transition from the clone_ready state 430 back to the clone_pending state.

At any time, the project may be transitioned to the disabled state 440. For example, regardless of whether the project is in the initial state, clone_pending state, or clone_ready state, the clone for the project may be manually disabled, such as by a site reliability engineering operator via tools. The clone may be disabled for repairs to hardware, resolution of errors or failures, regular maintenance, etc.

Figure 5:
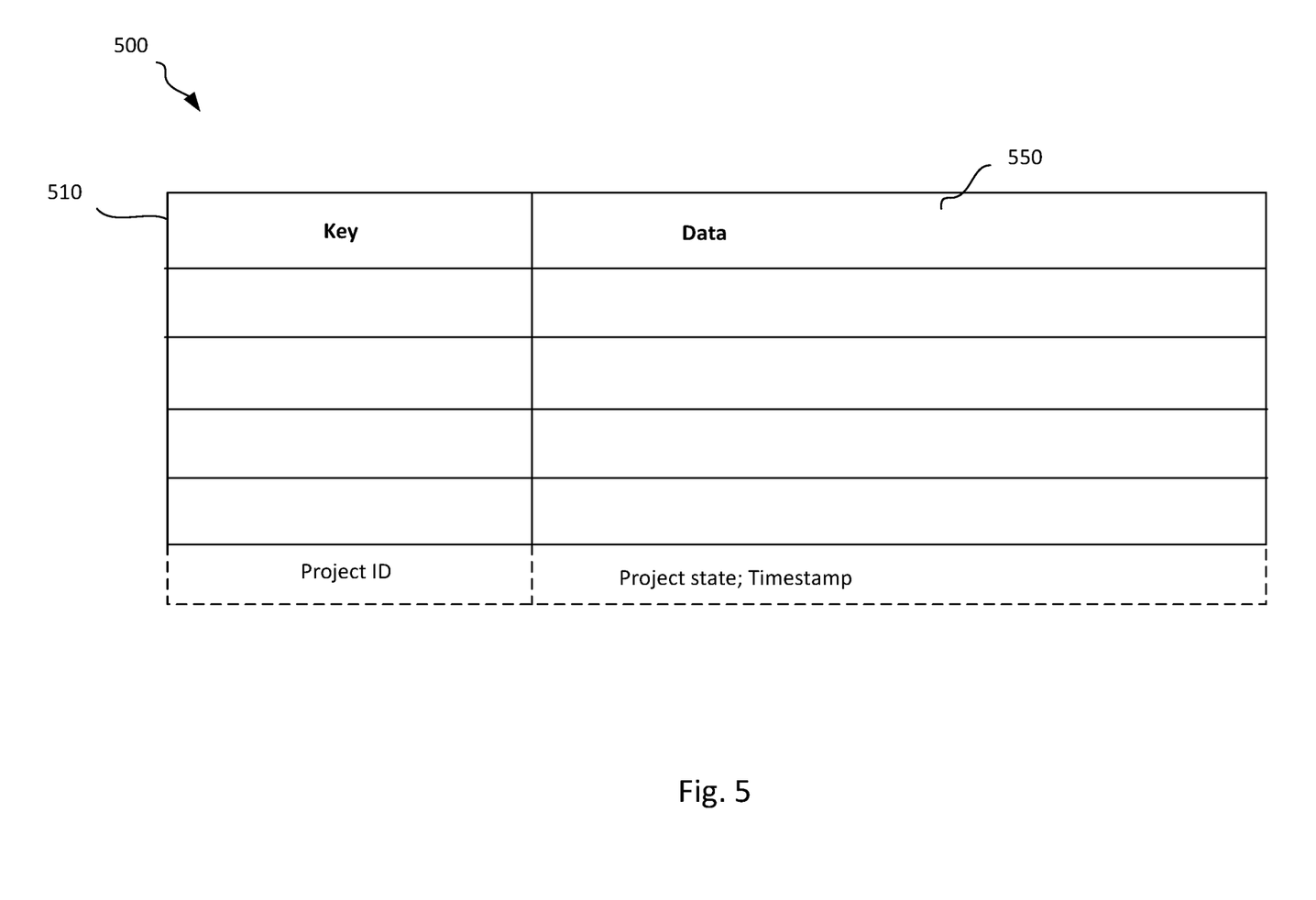
FIG. 5 illustrates an example of data chunks according to aspects of the disclosure.

FIG. 5 illustrates an example of how the project state may be identified along with data stored in the regional database. When the global database is updated, the updates may be replicated to the regional database in chunks. For example, FIG. 5 illustrates a regional database table 500, where the chunks of data are rows. Each row has a key 510 that identifies corresponding data 550. As the project is updated, one or more rows may be added, deleted, or modified. In addition, a row may be added identifying the project state for the project. For example, as shown, the key may include an identifier for the project. The row may further identify the project state, and the timestamp of the time when the project transitioned to that project state. Each time the project state changes, the row may be updated to reflect the most current project state and the timestamp indicating the time when the transition to that state occurred.

The table 500 may include data for one or multiple projects. Where multiple projects are included, the projects may be in different states at different times. Accordingly, each project will have a separate identifier, a separate project state, and a separate timestamp. For example, while Project A may have entered a clone_pending state at time t1, Project B may have entered a clone_ready state at time t2. As each of Project A and Project B transition to different state, their corresponding rows may be individually updated to reflect the most current state and timestamp.

While the table is described above as being located in the global clone, according to other examples it may be stored elsewhere in a region, such as in a region database.

Figure 6:
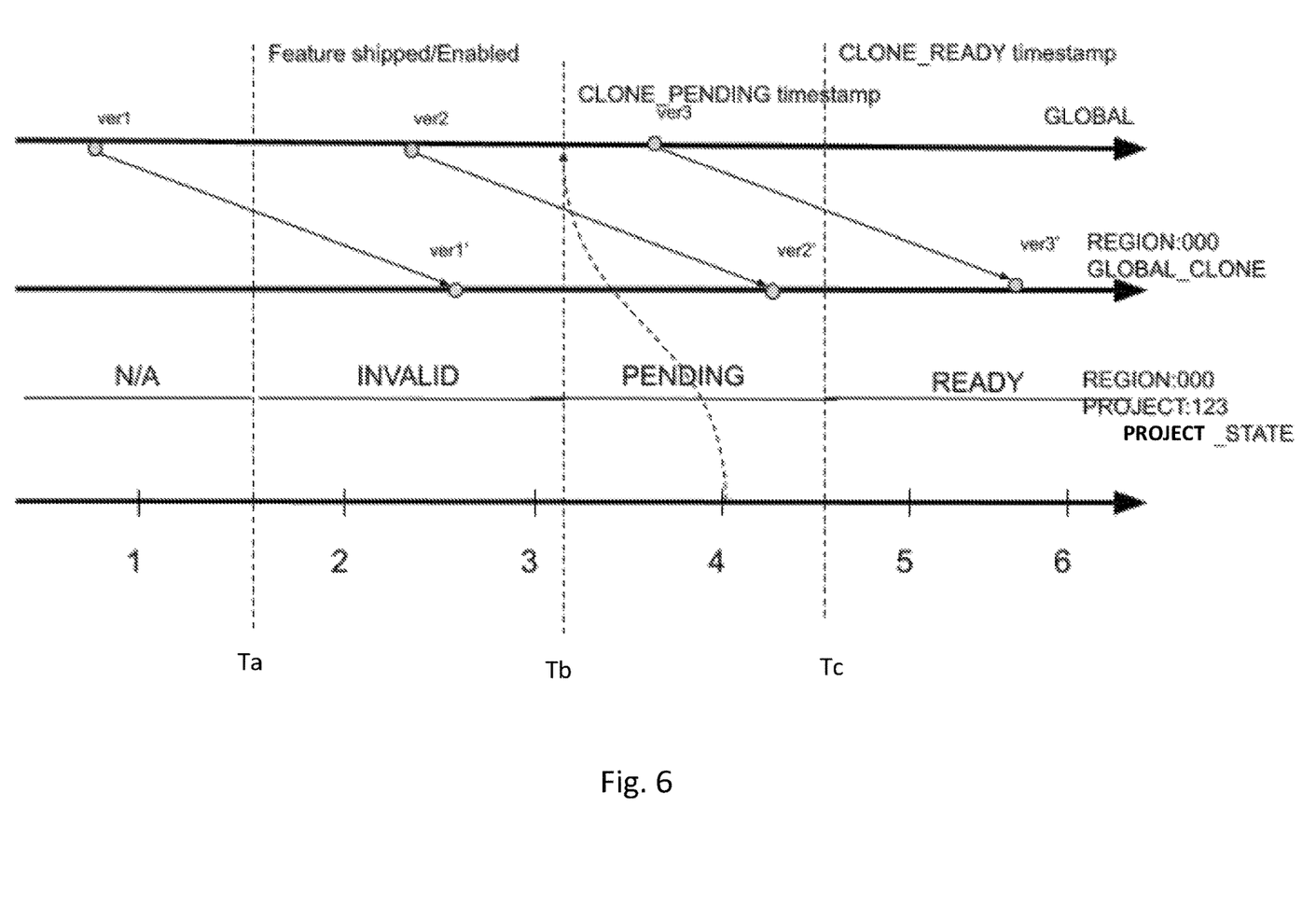
FIG. 6 is another timing diagram illustrating example transactions according to aspects of the disclosure.

FIG. 6 illustrates a timing diagram where the project states for individual projects are recorded in the regional database. The timing of the updates to the global database for the project and to the global clone is the same as the timing of FIG. 3. However, because the reads are processed based on the project states, the read requests will be handled differently than explained above in connection with FIG. 3.

Version 1 is updated in the global database prior to a time 1, but is not replicated in the global clone until after time 2. At time $T_a$, when the project is first enabled in the global clone, the project enters the invalid state. Accordingly, if a customer request were processed at time 1, the business logic would see version 1 from the global database.

After time $T_a$ and time 2, version 1 is enabled in the global clone. However, by this time, version 2 is available in the global database. At time 2, the business logic would still see version 1 from the global database, because it would ignore the global clone when the project is in the invalid state. Similarly, at time 3, when the project is still in the invalid state, the business logic would ignore the global clone and read version 2 from the global database.

At time $T_b$, the project is detected in the global clone. Accordingly, the project transitions from the invalid state to the clone_pending state. The timestamp $T_b$ is recorded as the time when the project entered the clone_pending state. As such, a customer request processed at time 4, when the project is still in the clone_pending state, would refer to the global database. However, rather than referring to the global database at the time 4, when version 3 has already been implemented in the global database, the request is referred to the global database at the time $T_b$, when the project entered the clone_pending state. Accordingly, the read request would produce version 2 from the global database.

At time Tc, the project enters the clone_ready state. For example, the control plane store may have verified that the global clone is up to date as compared to the recorded timestamp. Accordingly, the project transitions to the clone_ready state at time Tc, and the timestamp Tc is recorded.

A read processed at time 5 will produce version 2 of the feature from the global clone. By time 6, version 3 of the project has been implemented in the global clone. Accordingly, a read at time 6 will produce version 3 from the global clone.

Figure 7:
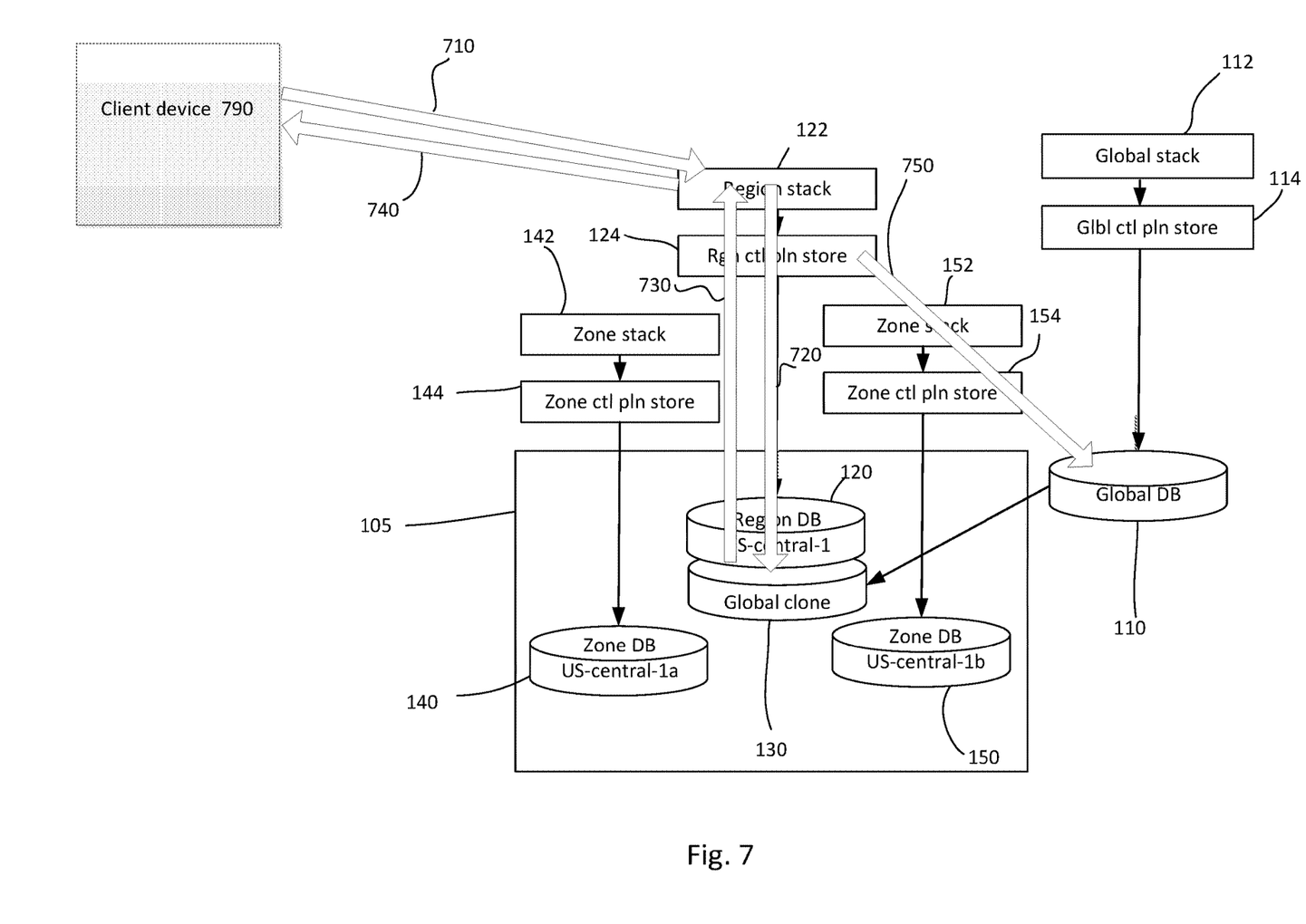
FIG. 7 is a block diagram illustrating a communication sequence according to aspects of the disclosure.

FIG. 7 is a block diagram illustrating a communication sequence where requests from a client 790 are served regionally by global clone 130. While the communications are listed numerically to facilitate description, it should be understood that some of the communications may occur in a different order or simultaneously. For example, background transactions to apply a load on the global database 110 may in some instances occur before or during service of a request by the global clone 130.

At 710, the client 790 issues a request to the region stack 122 for data. By way of example only, the request may be a request to create a disk from a snapshot.

Region control plane store 124 determines whether the global clone 130 is ready to handle the request. For example, the region control plane store 124 may determine whether the global clone 130 is sufficiently updated as compared to the global database 110. According to another example, the region control plane store 124 may determine whether the image is found in the global clone 130. The determination may be based on, for example, a result of a resource ready checker function in a client library of the region control plane store 124, information from a state machine associated with a project from which the data is requested, or any combination of these or other sources.

When the global clone 130 is ready, at 720 the request is sent to the global clone 130 and at 730 the data is retrieved. At 740, the data is provided to the client 790 to fulfill the request.

At 750, the region control plane store 124 runs a separate background transaction to apply a load to the global database 110. For example, the region control plane store 124 essentially replays the read request it had for the global clone 130 onto the global database 110.

In addition to the operations described above and illustrated in the figures, various operations will now be described. It should be understood that the following operations do not have to be performed in the precise order described below. Rather, various steps can be handled in a different order or simultaneously, and steps may also be added or omitted.

Figure 8:
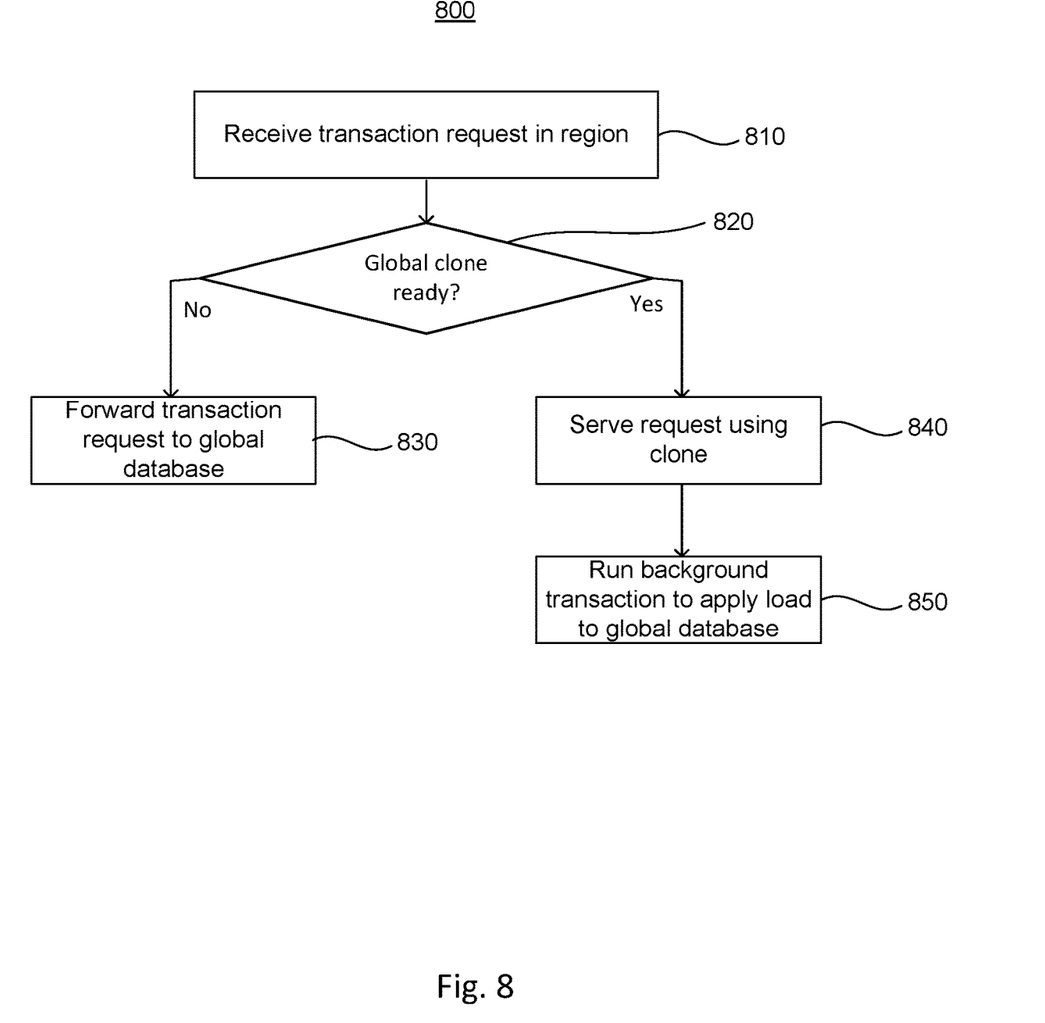
FIG. 8 is a flow diagram illustrating an example method of maintaining a constant load on the global database according to aspects of the disclosure.

FIG. 8 is a flow diagram illustrating an example method 800 of maintaining a constant load on the global database. Such method may be performed by a regional replication of the global database. For example, the method may be performed by one or more processors in the region control plane store.

In block 810, a transaction request is received. The request may be, by way of example only, a request to read data for a particular project.

In block 820, it is determined whether the global clone is ready to serve the request. For example, it may be determined whether replication of data for the project in the global clone is sufficiently caught up to the global database, such that a read of the global clone would be consistent.

If the global clone is determined to not be ready, the transaction is forwarded to the global database in block 830. The global database may then serve the request.

In block 840, if the global clone is determined to be ready, the request is served by the global clone. For example, the global clone retrieves the requested data and returns it to the client device. Further, in block 850, a background transaction is run to apply a load to the global database. For example, the region control plane store may initiate a request to the global database for the requested data. According to some examples, the request may include an indicator, such as a bit, flag, identifier, or the like, that indicates that the background transaction is only intended for applying a load to the database. As such, the global database knows to terminate the request after processing, as opposed to sending the data back to the client.

According to some examples, read transactions may be handled differently than read-write transactions. The differences in such examples are illustrated and described in connection with FIGS. 9 and 10, where FIG. 9 relates to a read transaction and FIG. 10 relates to a read-write transaction. In these examples, the transactions are structured as one or more attempts to complete the transaction, with the attempts being sub-requests to different entities, such as the global clone, global database, etc.

Figure 9:
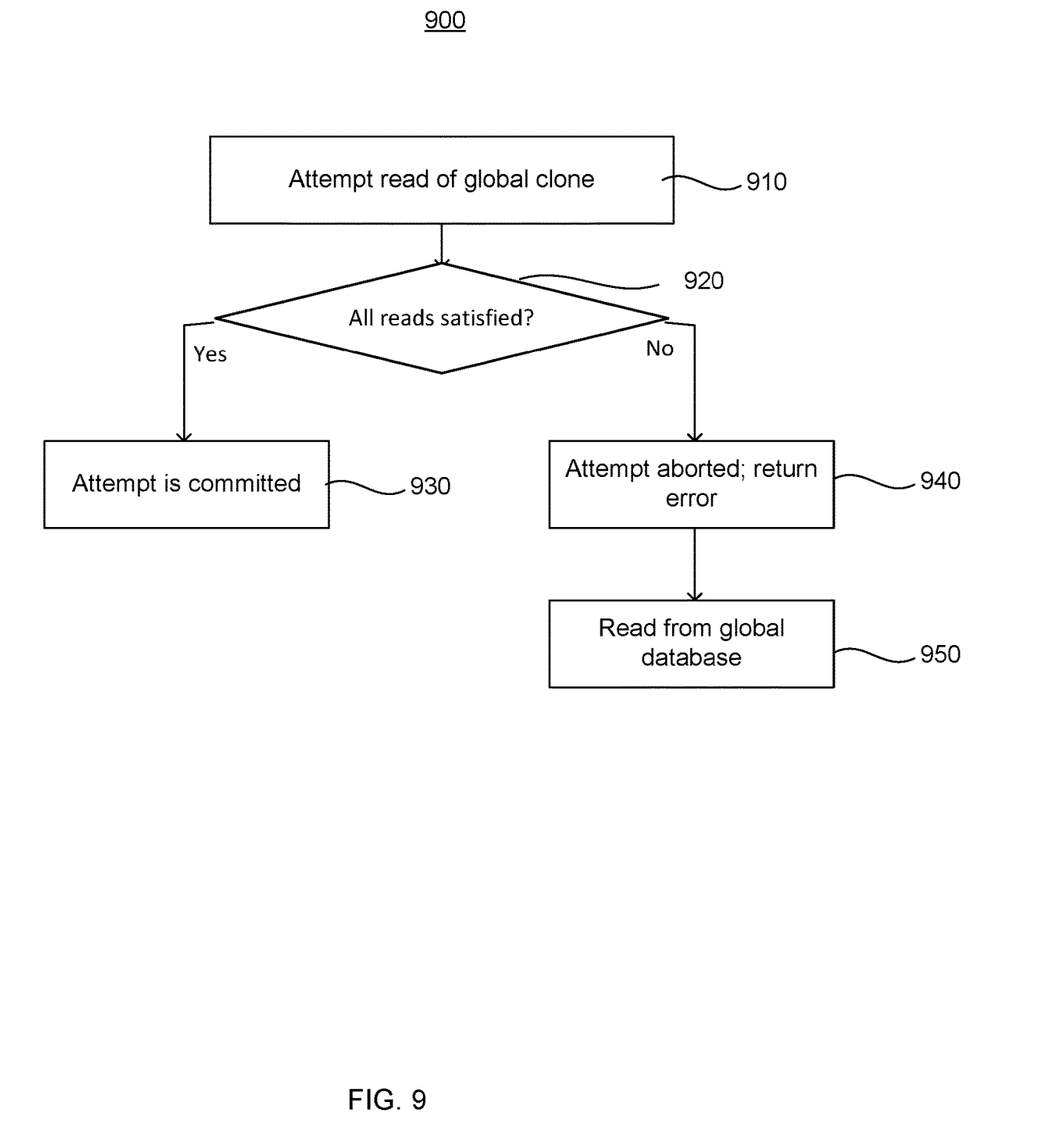
FIG. 9 is a flow diagram illustrating an example method of running read transactions according to aspects of the disclosure.

FIG. 9 is a flow diagram illustrating an example method 900 of running read transactions. In block 910, a first attempt is run, with reads going to the global clone.

In block 920, it is determined whether all reads have been satisfied. For example, reads may be considered satisfied if a row including the requested data is present in the global clone and the global clone is considered to be ready.

If all reads are satisfied, the first attempt is committed in block 930. If any reads fail, then the first attempt is aborted in block 940. An error message may be returned indicating that the read should be redirected to the global database.

In block 950, a second attempt is run with reads to the global database. According to some examples, subsequent attempts are also directed to the global database.

Figure 10:
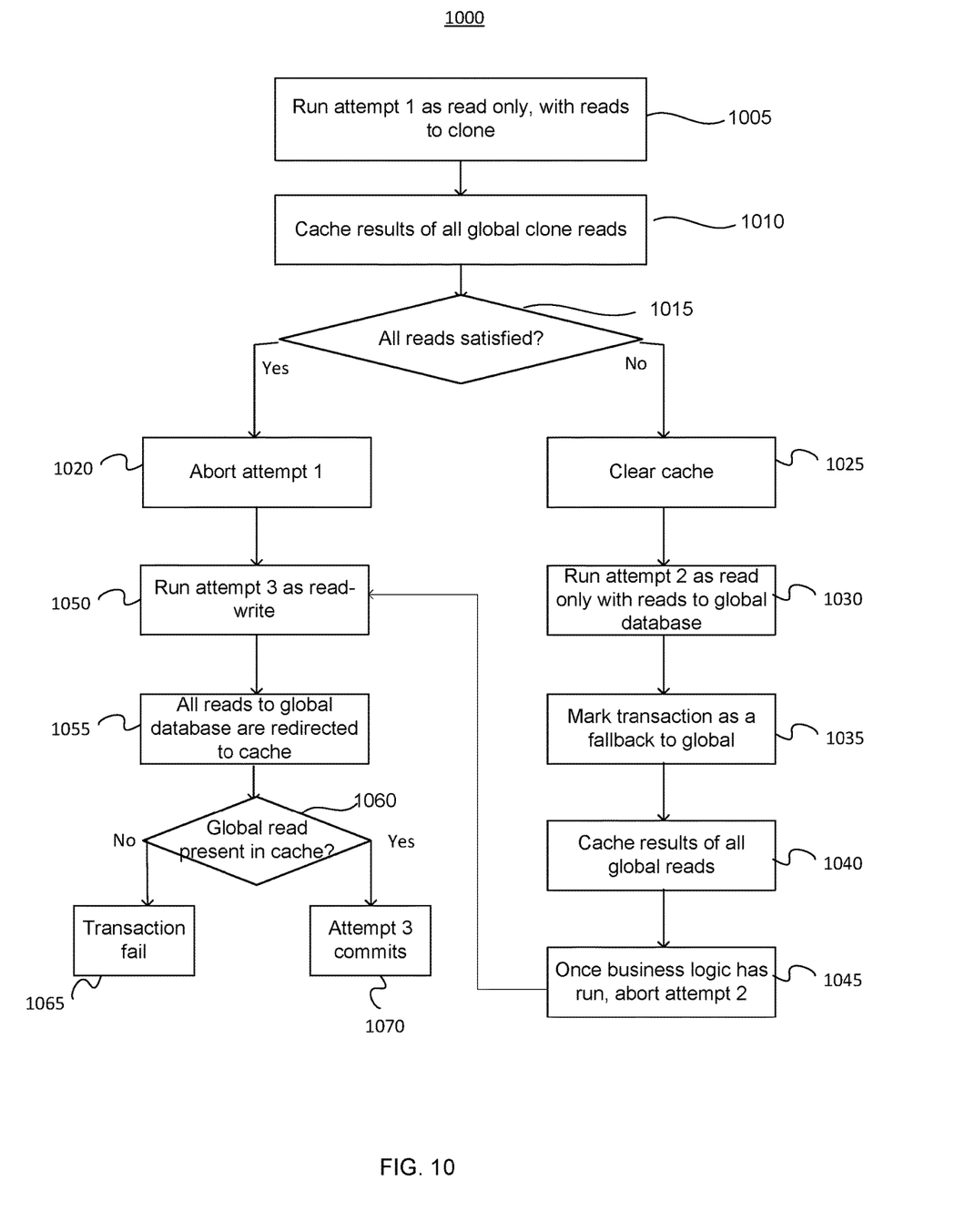
FIG. 10 is a flow diagram illustrating an example method of running read-write transactions according to aspects of the disclosure.

FIG. 10 is a flow diagram illustrating an example method 1000 of running read-write transactions. According to some examples the read-write transactions may be run by the client library in a retry loop.

In block 1005, a first attempt is run as read-only, with reads being directed to the global clone. In block 1010, the result of all global clone reads are cached.

In block 1015, it is determined whether all reads are satisfied. If so, the first attempt is aborted in block 1020. If not, the cache is cleared in block 1025 and the method proceeds to block 1030 where runs a second attempt. The second attempt is run as read only, with reads directed to the global database.

In block 1035, the transactions marked as having fallen back to the global database. In block 1040, results of all global reads are cached. In block 1045, once the business logic has run, the second attempt is aborted.

The method proceeds from each of blocks 1020 and 1045 to block 1050, where a third attempt is run as read-write. In block 1055, all reads to global are redirected to the cache. In block 1060, it is determine whether the reads from global are present in the cache. If not, the transaction fails in block 1065. If they are present however, the third attempt is committed.

The systems and methods described above are advantageous in that they provide for consistent reads in a global clone that is replicated from a global database. Requests served by regional replicas may be served quicker, as the request does not necessarily need to travel over long stretches of network to the global database. At the same time, the global database may continue operating as predicted, because a constant load is applied. For example, the global database will not scale down at times when most requests are served by the global clones. Accordingly, the global database remains ready to handle virtually all requests, and therefore a situation in which the global database is overrun with fallback requests is avoided.

Unless otherwise stated, the foregoing alternative examples are not mutually exclusive, but may be implemented in various combinations to achieve unique advantages. As these and other variations and combinations of the features discussed above can be utilized without departing from the subject matter defined by the claims, the foregoing description of the embodiments should be taken by way of illustration rather than by way of limitation of the subject matter defined by the claims. In addition, the provision of the examples described herein, as well as clauses phrased as "such as," "including" and the like, should not be interpreted as limiting the subject matter of the claims to the specific examples; rather, the examples are intended to illustrate only one of many possible embodiments. Further, the same reference numbers in different drawings can identify the same or similar elements.

The invention claimed is:

1. A method, comprising:
receiving, at a regional global clone in a first region replicating data of a global database, a transaction request;
determining, by one or more processors in the first region, whether the global clone is ready to fulfil the transaction request;
when the global clone is determined to be ready, fulfilling the transaction request by the global clone;
when the transaction request is fulfilled by the global clone, generating a background request for processing by the global database to apply a load to the global database without requiring a return, the background request corresponding to the transaction request; and
sending the background request to the global database for processing.

2. The method of claim 1, wherein determining whether the global clone is ready to fulfil the transaction request comprises determining, by the one or more processors, whether the global clone has been updated with data from the global database up to a given timestamp.

3. The method of claim 1, wherein determining whether the global clone is ready to fulfil the transaction request comprises determining, by the one or more processors, whether the global clone includes data sought by the transaction request.

4. The method of claim 1, wherein determining whether the global clone is ready to fulfil the transaction request further comprises calling a function in a client library of a region control plane store of the first region.

5. The method of claim 1, wherein the background request includes an indicator that a result need not be returned.

6. The method of claim 1, wherein the transaction comprises a read-write transaction to the global clone.

7. The method of claim 6, further comprising:
caching results of global database reads; and
redirecting reads to the global database to the cache.

8. A system, comprising:
one or more processors in communication with a regional global clone in a first region replicating data of a global database, the one or more processors configured to:
receive a transaction request from a client device;
determine whether the global clone is ready to fulfil the transaction request;
when the global clone is determined to be ready, fulfil the transaction request by the global clone;
when the transaction request is fulfilled by the global clone, generate a background request for processing by the global database to apply a load to the global database without requiring a return, the background request corresponding to the transaction request; and
send the background request to the global database for processing.

9. The system of claim 8, wherein the one or more processors, determining whether the global clone is ready to fulfil the transaction request, are further configure to determine whether the global clone has been updated with data from the global database up to a given timestamp.

10. The system of claim 8, wherein the one or more processors, determining whether the global clone is ready to fulfil the transaction request, are further configure to determine whether the global clone includes data sought by the transaction request.

11. The system of claim 8, further comprising a client library, the client library including a function executable by the one or more processors for determining whether the global clone is ready to fulfil the transaction request.

12. The system of claim 8, wherein the background request includes an indicator that a result need not be returned.

13. The system of claim 8, wherein the transaction comprises a read-write transaction to the global clone.

14. The system of claim 13, wherein the one or more processors are further configure to:
cache results of global database reads; and
redirect reads to the global database to the cache.

15. A non-transitory computer-readable medium storing instructions executable by one or more processors for performing a method of serving read requests to a global clone, the method comprising:
receiving, at a regional global clone in a first region replicating data of a global database, a transaction request;
determining whether the global clone is ready to fulfil the transaction request;
when the global clone is determined to be ready, fulfilling the transaction request by the global clone;
when the transaction request is fulfilled by the global clone, generating a background request for processing by the global database to apply a load to the global database without requiring a return, the background request corresponding to the transaction request; and
sending the background request to the global database for processing.

16. The non-transitory computer-readable medium of claim 15, wherein determining whether the global clone is ready to fulfil the transaction request comprises determining whether the global clone has been updated with data from the global database up to a given timestamp.

17. The non-transitory computer-readable medium of claim 15, wherein determining whether the global clone is ready to fulfil the transaction request comprises determining whether the global clone includes data sought by the transaction request.

18. The non-transitory computer-readable medium of claim 15, wherein the background request includes an indicator that a result need not be returned.

19. The non-transitory computer-readable medium of claim 15, wherein the transaction comprises a read-write transaction to the global clone.

20. The non-transitory computer-readable medium of claim 19, further comprising:
caching results of global database reads; and
redirecting reads to the global database to the cache.

* * * * *